United States Patent

[11] 3,547,461

| | | |
|---|---|---|
| [72] | Inventor | Donald E. Sheridan<br>318 South 4th, Dekalb, Ill. 60115 |
| [21] | Appl. No. | 708,276 |
| [22] | Filed | Feb. 26, 1968 |
| [45] | Patented | Dec. 15, 1970 |

[54] VEHICLE SUSPENSION
15 Claims, 8 Drawing Figs.

[52] U.S. Cl. .................................................... 280/104.5
[51] Int. Cl. ...................................................... B60g 19/02
[50] Field of Search ........................................... 280/104.5, 104.5A

[56] References Cited
UNITED STATES PATENTS

| 2,096,530 | 10/1937 | Alden | 280/104.5A |
| 3,055,675 | 9/1962 | Brecko | 280/104.5A |
| 3,328,047 | 6/1967 | Bugyie | 280/104.5 |

FOREIGN PATENTS

| 493,536 | 3/1930 | Germany | 280/104.5A |

*Primary Examiner*—Philip Goodman
*Attorney*—Greist, Lockwood, Greenawalt and Dewey ABSTRACT: A wheel suspension for vehicles which is mounted on pivot brackets beneath the side members of the vehicle support frame wherein each axle housing has radial arms fixed thereon and extending forwardly of the axle housing and above and below the axis of the housing, or at the center line of the housing, with one of the arms connected to a pivot bracket, or to one end of a walking beam which is in turn connected to a pivot bracket, for transmitting stress between the frame and the axle housing so that a horizontal force component results, and with the other radial arm on the axle housing having a pivotal connection with one end of a force absorbing or force canceling bar member which is connected at an opposite end to a pivot bracket which is spaced forwardly of the stress transmitting bracket or to an adjacent axle housing, whereby horizontal force components are absorbed or canceled by the force bar member.

PATENTED DEC 15 1970

INVENTOR
DONALD E. SHERIDAN

BY Drest, Lockwood, Greenawalt
& Dewey
ATT'YS.

VEHICLE SUSPENSION

This invention relates to wheel-supported vehicle structures and is more particularly concerned with improvements in suspension systems for attaching wheel axles to the vehicle frame.

It is a general object of the invention to provide an axle suspension system for vehicles wherein horizontal components of stresses transmitted to the axles as the result of static loads, braking, etc. are canceled or absorbed by unique force absorbing or canceling members which are incorporated in the suspension system.

It is a more specific object of the invention to provide in a wheel-supported vehicle a wheel suspension system wherein walking beams are pivotally mounted beneath the vehicle side frame members and connected at opposite ends to radial arms extending above and below a pair of axle housings and forwardly of the vertical plane of each axle so that stresses transmitted to the axles are equally distributed and have horizontal components which are equal and opposite in direction whereby they may be absorbed or canceled by a bar member connecting the axles to which these components are transferred.

It is another object of the invention to provide an axle suspension system for a wheel-mounted vehicle wherein a pair of axles are spaced longitudinally of the vehicle frame and equal distances from a depending pivot bracket at each side of the frame and a walking beam is pivotally supported on each said pivot bracket intermediate its ends with the opposite ends thereof connected by pivots to radial arms fixed on the axle housings and extending at an angle forwardly of the housings and above and below the axles so as to distribute the static load equally between the axles with resultant horizontal stress components which are equal in amount and opposite in direction, and wherein a stress absorbing rod assembly is connected by pivots at opposite ends to fixed radial arms extending from the axle housings in a direction generally opposite that of the associated arms which connect the housings with the walking beam whereby the horizontal stress components are canceled or absorbed.

It is still another object of the invention to provide a three-axle suspension system for a wheel-supported vehicle wherein the axles are equally spaced in parallel relation longitudinally of the vehicle frame and connected to the frame side members by a pair of walking beams which are pivoted intermediate their ends to pivot brackets depending from the frame side member and spaced intermediate the foremost and rearmost axles and the middle axle, with each walking beam pivoted at its foremost end to a radial arm fixed on an axle housing and inclined forwardly of the vertical plane of the housing and with the rearmost end of each walking beam pivoted to a radial arm fixed on the associated axle housing and extending in an opposite direction relative to the horizontal plane of the housing, and force rod assemblies connecting the foremost and rearmost axle housings with the middle axle housing so as to cancel or absorb horizontal components of stresses transmitted to the axles through the walking beams.

It is a further object of the invention to provide an axle suspension system for vehicles wherein each axle housing has fixed radial arms extending above and below the housing, one of which is pivotally connected to a load transmitting member extending beneath the vehicle support frame, so that the force transmitted to the axle has a horizontal component and tends to rotate the axle housing about the axis thereof, the other arm having a pivotal connection with a force absorbing or canceling bar member, which is connected at the opposite end thereof to a depending pivot bracket fixed to the frame or to an adjacent axle housing, with the force bar member acting to absorb or cancel horizontal force components resulting from the axle connection to the vehicle frame.

A still further object of the invention is to provide in a suspension system having force canceling or absorbing characteristics, torque rods arranged to insure the stability of the suspension structure and to prevent any rotation of the axle housings.

These and other objects and advantages of the invention will be apparent from a consideration of the suspension systems which are shown by way of illustration in the accompanying drawings, wherein.

Figure 1:
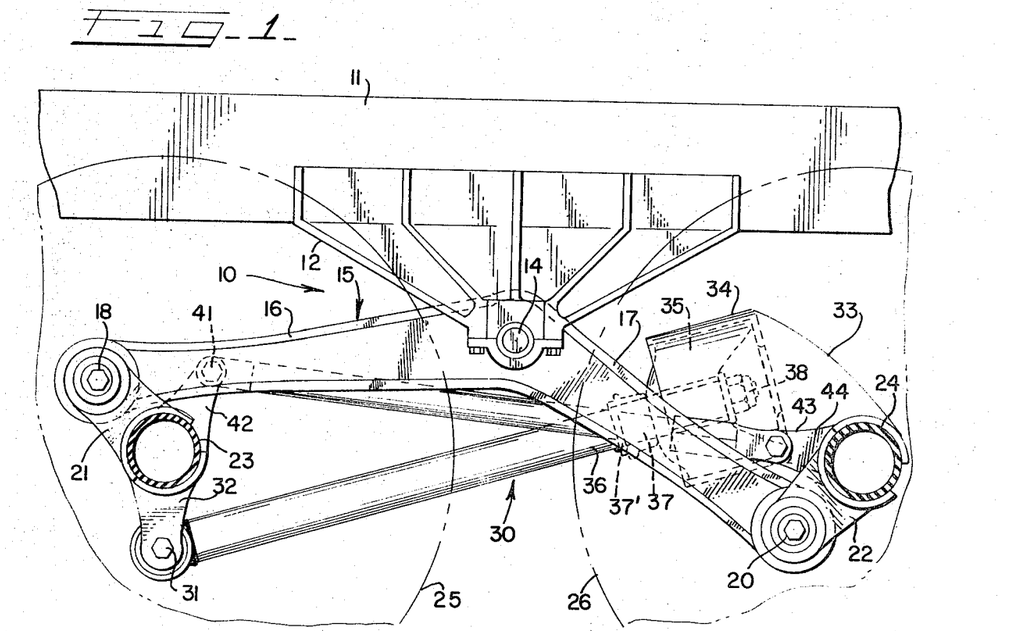
FIG. 1 is a side elevation of a two-axle suspension system in which horizontal stress components are, under normal operating conditions, canceled through a compression bar or rod assembly connecting the axle housings.
Figure 2:
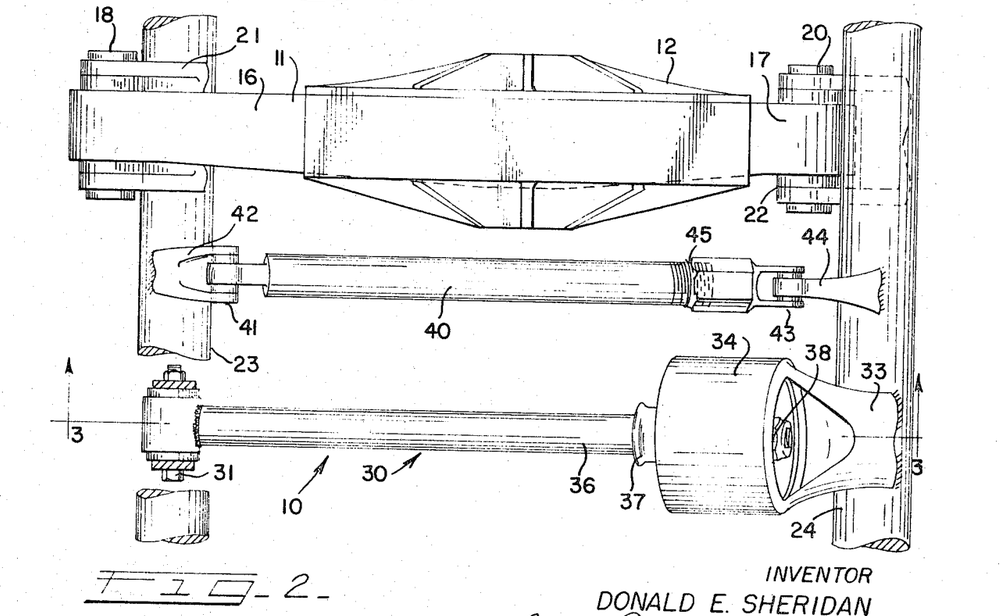
FIG. 2 is a partial plan view of the suspension system shown in FIG. 1.
Figure 3:
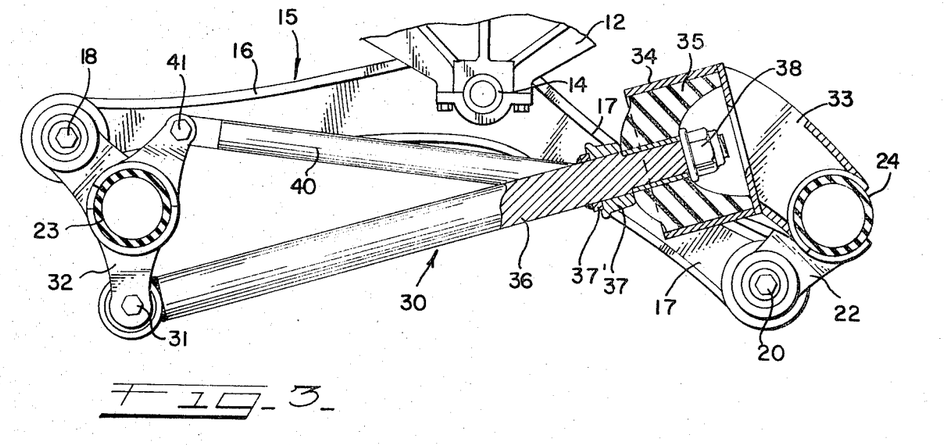
FIG. 3 is a partial longitudinal section taken on the line 3—3 of FIG. 2.

Referring to FIGS. 1 to 3 inclusive of the drawings, there is illustrated a two-axle suspension system 10 mounted beneath the bottom frame of a typical vehicle frame construction which may be found in a trailer, for example, and which includes parallel, longitudinally extending side frame members 11. A pivot bracket 12, which may be of fabricated or cast construction, is bolted or otherwise secured so as to depend beneath each of the side frame members 11 with a bearing pivot assembly 14 for connecting thereto the walking beam 15, which may be, likewise, of fabricated or cast construction. The brackets 12 may be connected by a crossbar member 13 extending transversely of the vehicle frame for increased stability. The pivot connection 14 is located intermediate the ends of the beam 15 at the juncture of two angularly related arms 16 and 17. The walking beam arms 16 and 17 are connected at their ends by pivots 18 and 20 to the free ends of relatively short, radially extending bracket arms 21 and 22 fixed on longitudinally spaced axle housings 23 and 24 in which the axles for wheels 25 and 26 are contained. The axle housings 23 and 24 are parallel and equally spaced from pivot bearing 14. The bracket arm 21, which connects arm 16 of the walking beam 15 with axle housing 23, is fixed on the top side of the axle housing 23 and inclined forwardly in the direction of travel of the vehicle at a predetermined angle relative to a vertical plane extending through the axle housing 23. The bracket arm 22 forming the connection between the walking beam arm 17 and the rear axle housing 24 extends in fixed relation to the housing below the same and at a forward angle relative to the vertical plane which corresponds to the angle of inclination of the bracket arm 21 relative to the vertical plane of the housing 23. Thus the static load transmitted through the walking beam arms 16 and 17 to the axle housings 23 and 24 is equally distributed between the two housings and through the arms 21 and 22 tends to rotate the housings in a counterclockwise direction about their axes.

A specially designed force absorbing bar or rod assembly 30 connects the axle housings 23 and 24 with one end thereof pivotally connected at 31 to a bracket arm 32 fixed on the forward axle housing 23 and extending below the same. The pivot point 31 is the same distance from the axial center of the housing 23 as the pivot point 18 which connects the arm 21 with the forward arm 16 of the walking beam 15. The force bar or rod assembly 30 is inclined upwardly toward the rear axle housing 24 and connected at its rearmost end to the bracket 33 which is fixed to the housing 24 and extends above the same. The end connection of the bar assembly 30 with the bracket 33 comprises a housing 34 in which a bushing 35, of rubber or similar resilient material, is confined, which bushing or shear spring 35 is secured on the threaded end of a rod or bar member 36 by a stop washer 37 set against the shoulder 37′, and locknut 38 so as to provide a resilient connection between the bar member 36 and the bracket 33, the latter being fixed to the axle housing 24. The force bar or rod assembly 30 is mounted on the longitudinal centerline of the vehicle frame with the shear spring bushing 35 under tension, as shown in FIG. 3, for normal static loads. The assembly 30 forms a compression absorbing connection between the axle housings 23 and 24. The assembly 30, as shown, employs a shear spring bushing 35 which is of the type illustrated in Miller U.S. Pat. No. 2,980,439, dated Apr. 18, 1961. However, a different shock absorbing member may be employed, for example, a coil spring or an air bag.

The suspension assembly 10 is completed by a pair of torque bars or rods 40, only one of which is shown in FIG. 2. The torque rods 40 are mounted inside the frame side members 11 with one end thereof pivotally connected at 41 to the free end of a bracket forming radial arm 42 fixed on and extending from the forward axle housing 23. At the opposite end each torque rod 40 is attached by pivot 43 to a bracket forming radial arm 44 fixed on the rear housing 24. The torque rod 40 may be connected to the bracket 44 for adjustment at 45. The arrangement is such that the pivots 41 and 43 are on the same arc about the axle centers as the pivot points 18 and 20, respectively, and these pivot point connecting lines form a trapezoid. For any given deflection in the shear spring 35 due to normal load application the arc displacement of pivots 43 and 41 must be equal with reference to the pivot points 18 and 20, respectively, to maintain zero load on the torque rods 40. The only loads that will be imposed on the torque rod 40 will result from unequalized braking torque loads induced by throwing one wheel off the ground and simultaneously applying the brakes. The torque rods will then maintain suspension stability.

Figure 4:
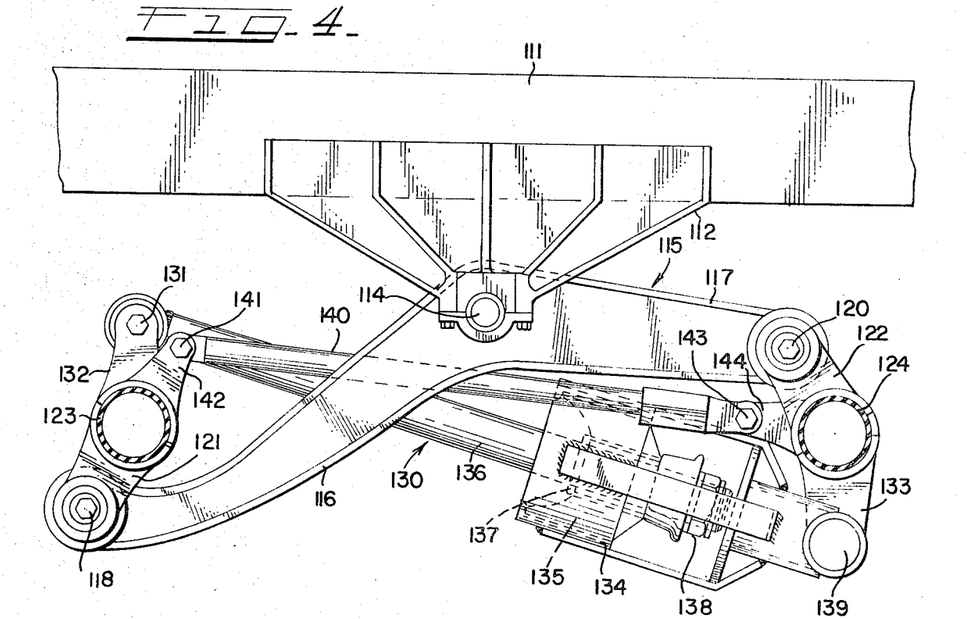
FIG. 4 is a side elevation of a two-axle suspension system in which the horizontal stress components are absorbed by a tension bar assembly connecting the axle housings.

Referring to FIG. 4 of the drawings, there is illustrated another form of the suspension system for two parallel, longitudinally spaced axles. In this form of the suspension the side frame members 111 are provided with depending pivot brackets 112 housing pivot bearings 114 for connecting the walking beams 115. The pivot 114 is intermediate the ends of the associated walking beam 115 and equally spaced between the axes of the axle housings 123 and 124. The walking beam 115 has a forward arm 116 and a rearward arm 117 of shorter length. The forward arm 116 is connected by pivot 118 to the free end of a radially extending, bracket form arm 121 which projects below the housing 123 and at an angle forwardly of the vertical plane extending through the transverse axis of the housing 123. The shorter rearward arm 117 of the walking beam 115 is connected by pivot 120 to the free end of the bracket arm 122 which is fixed on the axle housing 124. The bracket arm 122 extends upwardly of the housing 124 and is inclined forwardly of a vertical plane in which the axis of the housing 124 extends. The angle of inclination of the bracket arm 122 relative to the vertical plane is the same as that of the bracket arm 121 relative to the vertical plane in which the axis of the forward axle housing 123 extends and the pivot centers 118 and 120 are equidistant from the axes of the respective axle housing housings 123 and 124 so that the load transmitted through the walking beam 115 is equally distributed to the wheel axles. A force bar or rod assembly 130 extends between the axle housings 123 and 124 which is connected at one end by pivot 131 to a radial arm 132 fixed on the housing 123. At its other end the assembly 130 is pivotally connected to a radially extending bracket arm 133 which is fixed on the axle housing 124. The assembly 130 includes a housing 134 in which a shear spring 135 is confined. The shear spring 135 is secured on the end of rod member 136 between the shoulder 137 and the washer and nut assembly 138. The shear spring housing 134 is pivoted at 139 to the end of the bracket arm 133. The radial bracket arms 132 and 133 extend upwardly and downwardly, respectively, of the shaft housings 123 and 124 and the pivots 131 and 139 are approximately in the same vertical plane as the axes of the shaft housings. The pivots 131 and 139 are spaced a distance from the axes of the axle housings 123 and 124 corresponding to the radial distance of the walking beam end pivots 118 and 120 from the same centers. The shear spring 135 at the end of assembly 130 is tensioned as shown under normal static load. The suspension is completed by a pair of torque rods 140, each of which has one end pivotally attached at 141 to a bracket arm 142 extending radially from the axle housing 123 and the other end attached by pivot 143 to a bracket arm 144 extending radially from the axle housing 124. Both bracket arms 142 and 144 are inclined relative to a vertical plane in the direction of the pivot 114. The torque rods 140 serve to maintain the stability of the suspension in the event that one of the axles is thrown clear of the road surface and the brakes are applied simultaneously. They also serve to insure that the axle housings 123 and 124 do not have any rotative movement.

The force bar assembly 130 and its associated connecting means prevents counterclockwise rotation of the shaft housings 123 and 124 which could otherwise occur due to the horizontal component of force transmitted by the walking beam. With the arrangement shown in this form of the suspension, static loads are equal and opposite so that transmitted to the force bar assembly 130, which acts as a tension absorbing member, they are self-canceling. Shock loads will act in the same direction and simply increase the tension load on the force bar assembly. Braking loads will have the same effect and will serve to increase the tension load on the bar assembly. The capacity for absorbing shock of the shear spring must, of necessity, be adequate to compensate for the stress resulting from static load, shock load and braking loads.

With the illustrated design an important feature is the fact that at no time during normal operation will there be a load reversal. The direction of travel could be reversed and the brake applied so as to cause a load reversal and this is compensated for by adding the torque rods between the axles.

Figure 5:
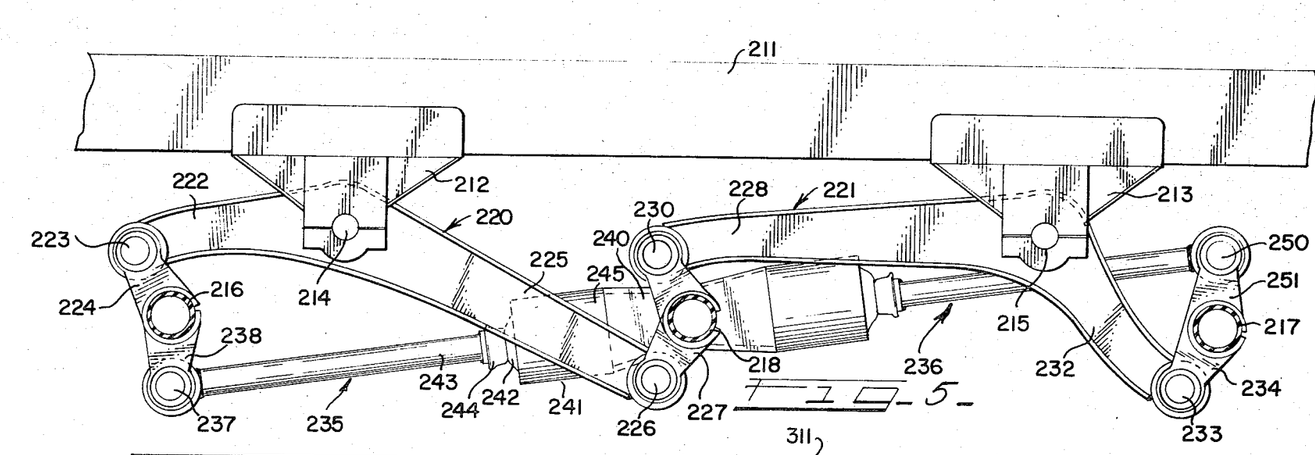
FIG. 5 is a side elevation of a three-axle suspension system with portions broken away, the section employing stress absorbing bar assemblies connected between the axle housings which are under compression with normal static loads.

Referring to FIG. 5 of the drawings, there is illustrated a three-axle suspension system which embodies the principles of the invention. In this form of suspension system the side frame members 211 are provided with two longitudinally spaced support brackets 212 and 213 which depend therefrom and provide bearings for pivots 214 and 215 spaced equal distances toward each other from the foremost and rearmost axle housings 216 and 217 with the middle axle housing 218 being equally spaced between the two housings 216 and 217. Specially designed walking beams 220 and 221 are mounted intermediate their ends on the pivots 214 and 215. The forward walking beam 220 has a relatively short forward arm 222 connected by pivot 223 with a radial bracket 224 extending upwardly of the axle housing 216 and forward of a vertical plane through the axis of the axle housing 216. The longer rearward arm 225 of the walking beam 220 is connected by the pivot 226 with a bracket arm 227 extending downwardly of the middle axle housing 218 and forwardly of a vertical plane through its axis. The angle of forward inclination of the bracket arms 224 and 227 relative to the vertical plane extending through the axis of the associated axle housing is the same. The radial distance of pivots 223 and 226 from the axle housing centers is the same. The rearmost walking beam 221 has its forward arm 228 connected by the pivot 230 with a radial bracket arm 231 extending upwardly of the axle housing 218 and forwardly of a vertical plane through the axis thereof. The shorter downwardly inclined rearward arm 232 of the walking beam 221 is connected by the pivot 233 with a radial bracket arm 234 which extends downwardly of the rearmost axle housing 217 and forwardly of a vertical plane through the axle thereof. The radial distance of the pivots 230 and 233 from the axle housing centers is the same as for pivots 223 and 226. The force transferred through the ends of the walking beams 220 and 221 to the axles in this arrangement tends to rotate the axle housings in a counterclockwise direction. Force absorbing bar assemblies 235 and 236 are connected between the foremost and rearmost housings 216 and 217, respectively, and the center housing 218. The foremost assembly 235 is connected by the pivot 237 with the free end of a downwardly extending radial bracket arm 238 which is fixed on the foremost axle housing 216. The pivot 237 is approximately in the same vertical plane as the axis of the housing 216. Pivots 223 and 237 are spaced radially equidistant from the axis of the axle housing 216. At its other end the force bar assembly 235 is fixed on the middle axle housing 218 by a bracket 240 which includes a housing 241 for a shear spring 242 mounted therein and secured on the end of the bar member 243 by shoulder backed washer 244 and nuts 246 in the same manner as the shear spring connection between the bar member 36 and the bracket 33 in FIG. 1. The force bar assembly 236 which extends between the rearmost shaft housing 217 and the center housing 218 is connected by the pivot 250 to a radial arm 251 extending upwardly of the housing 217, the pivot 250 and the axis of the housing 217 being in approximately the same vertical plane and the radial distance of the pivot 250 and the pivot 233 from the axis of the axle housing 217 being the same as the radial distance of pivots 223 and 237 from the axis of axle housing 216. At the other end the force bar assembly 236 is connected to the axle housing 218 by a bracket 252 having a housing 253 for a shear spring connection of the same character as the connection of the bar 243 with the housing 241.

The middle axle housing 218 is cushioned only through the walking beams to the front and rear axle housings 216 and 217 and cannot rotate under static or shock loads with the result that it stabilizes the front and rear axles and torque rods are not required. The two brackets 227 and 231 which extend radially from the axle housing 218 can be rotated relative to the vertical plane extending through the axis of the housing 218 without affecting the weight distribution characteristics. The axle housing 218 could house a drive axle for the suspension.

Figure 6:
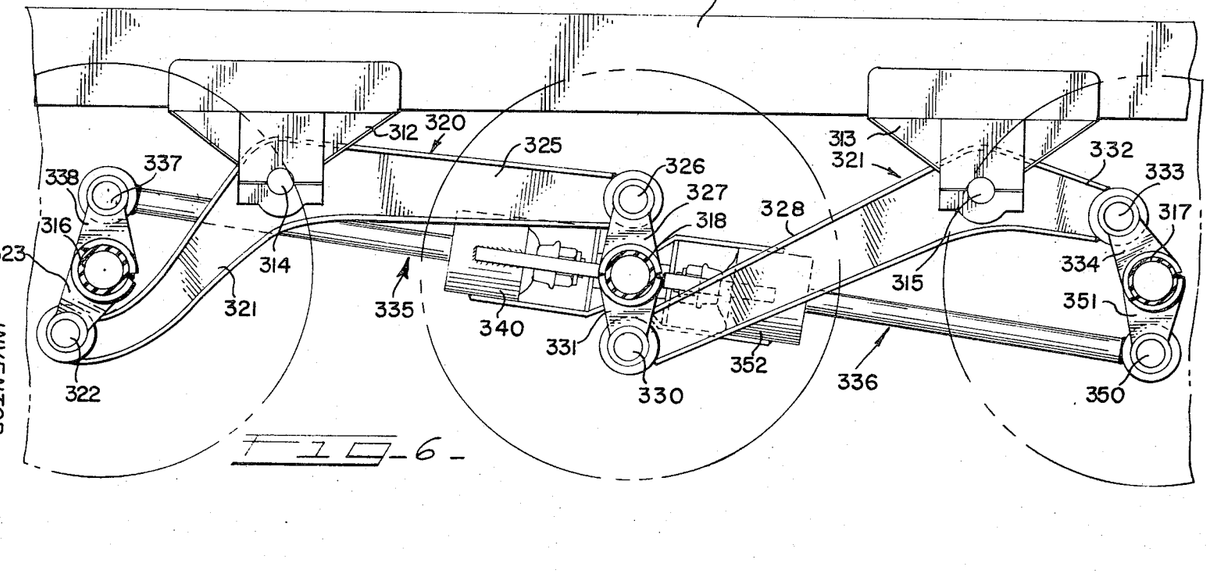
FIG. 6 is a side elevation of a three-axle suspension system employing stress absorbing bar assemblies which are tensioned under normal static loads.

In the three-axle suspension which is illustrated in FIG. 5, the force bar assemblies function as compression absorbing members. The suspension can be rearranged to employ tension absorbing force bar assemblies as shown in FIG. 6. The frame side members 311 are provided with longitudinally spaced support brackets 312 and 313 which provide bearings for pivots 314 and 315 spaced equal distances toward each other from the foremost and rearmost axle housings 316 and 317 with the middle housing 318 equidistant from the housings 316 and 317. Forward and rearward walking beams 320 and 321 are mounted intermediate their ends on pivots 314 and 315. The forward walking beam 320 has a short forward arm 322 connected by pivot 323 with radial bracket 324 extending downwardly of axle housing 316 and forwardly of a vertical plane through the axes of housing 316 a longer rearward arm 325 connected by pivot 326 with radial bracket 327 extending upwardly of the middle axle housing 318 in a vertical plane through its axis. The rearward walking beam 321 has a long forward arm 328 connected by pivot 330 with radial bracket arm 331 which extends downwardly of the middle axle housing 318 in the same vertical plane as bracket arm 327 and a shorter rearward arm 332 connected by pivot 333 to the radial bracket 334 extending downwardly of the rearmost axle housing 317 and forwardly of a vertical plane through the axis of the housing 317. Tension absorbing force bar assemblies 335 and 336 extend between the axle housings 316 and 317 and the middle axle housing 318. The foremost force bar assembly 335 is connected by pivot 337 with the free end of upwardly extending radial bracket arm 338 on the foremost axle housing 316. The pivot 337 is in the same vertical plane as the axis of the housing 318. At its other end the force bar assembly 335 is connected to the middle axle housing 318 by bracket 340 which houses a shear spring of the same construction as the shear spring 135 of the assembly 130 in the form of the suspension shown in FIG. 4. The rearmost force bar assembly 336 is connected at the rearward end by pivot 350 to a radial arm 351 extending upwardly of the axle housing 317 and in a vertical plane extending through the axis of housing 317. At the other end the force bar assembly 336 is connected by bracket 352 with the middle axle housing 318 which bracket 352 houses a shear spring of the same construction as the shear spring 135 of the assembly 130 in the form of the suspension shown in FIG. 4. The shock absorbing shear spring connections could be disposed at the opposite ends of the force bar assemblies 335 and 336. The two force absorbing bar assemblies 335 and 336 are longitudinally aligned and in an inclined plane extending through the axis of the middle axle housing 318. The pivots 322, 326, 330, 333, 337 and 350 are all the same radial distance from the axis of the associated axle housing.

Figure 7:
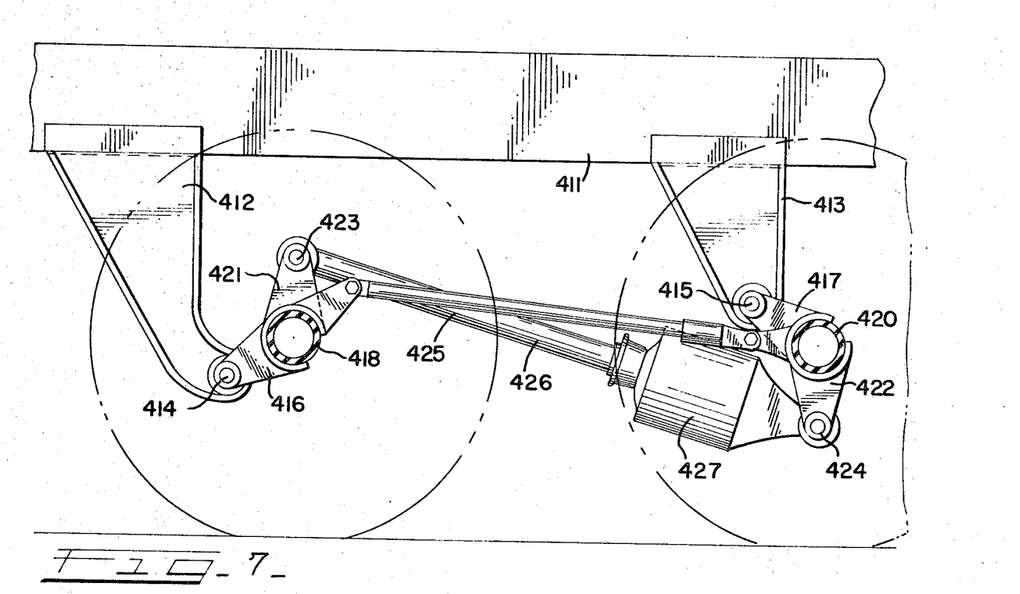
FIG. 7 is a side elevation of a two-axle suspension system in which the axle housings are pivotally connected to brackets fixed on the vehicle frame and horizontal stress components are absorbed by a tension bar assembly connecting the axle housings.

Referring to FIG. 7 of the drawings, there is illustrated another form of the suspension system for two parallel, longitudinally spaced axles. In this form of the suspension the side frame members 411 are provided with depending pivot brackets 412 and 413 housing pivot bearing 414 and 415 for connecting the forward ends of radial arms 416 and 417 which are fixed on the axle housings 418 and 420. The axle housings 418 and 420 are disposed in parallel relation and extend transversely of the vehicle beneath the support frame side members 411 at the same elevation when the wheels are on level ground. The radial arms 416 and 417 extend forwardly of the axle housings in the forward direction of the frame side members 411 with the arm 416 inclined downwardly of the horizontal plane in which the axle housing 418 extends and forwardly of the vertical plane thereof and with the arm 417 inclined upwardly of the horizontal plane in which the axle housing 420 extends and forwardly of the vertical plane thereof so that the force transmitted through the bearings 414 and 415 due to load, etc. tends to rotate the axle housings 418 and 420 counterclockwise due to the horizontal force component resulting from the radial arm mounting. Radial arms 421 and 422 extend upwardly and downwardly of the housings 418 and 420, respectively, and are connected by pivots 423 and 424 to opposite ends of a force bar assembly 425 which is of the same construction as the force bar assembly 130 in the system illustrated in FIG. 4. The pivot points 423 and 424 are the same distance from the axes of the housings 418 and 420 as the pivot points 414 and 415 and the radial arms extend upwardly and downwardly relative to the housings 418 and 420, respectively, and in the same vertical plane as the axes of the housings. The force rod assembly 425 comprises a rigid bar member 426 and a shear spring assembly indicated schematically at 427 or an equivalent coil spring, air spring or the like. The system is completed by the addition of torque rods 430 connected at opposite ends to the axle housings 418 and 420 by suitable brackets 431 and 432. The torque rods serve to maintain the stability of the suspension under the operating conditions referred to in connection with the system of FIG. 4. This form of the system eliminates the need for the walking beams employed in the form of the system illustrated in FIG. 4. This design may be modified to employ brackets 412 and 413 which are identical, with the pivot points 414, 415 then being disposed in the same plane with the axes of the housings 418 and 420 in the longitudinal direction below the side frame member 411 when under static load.

Figure 8:
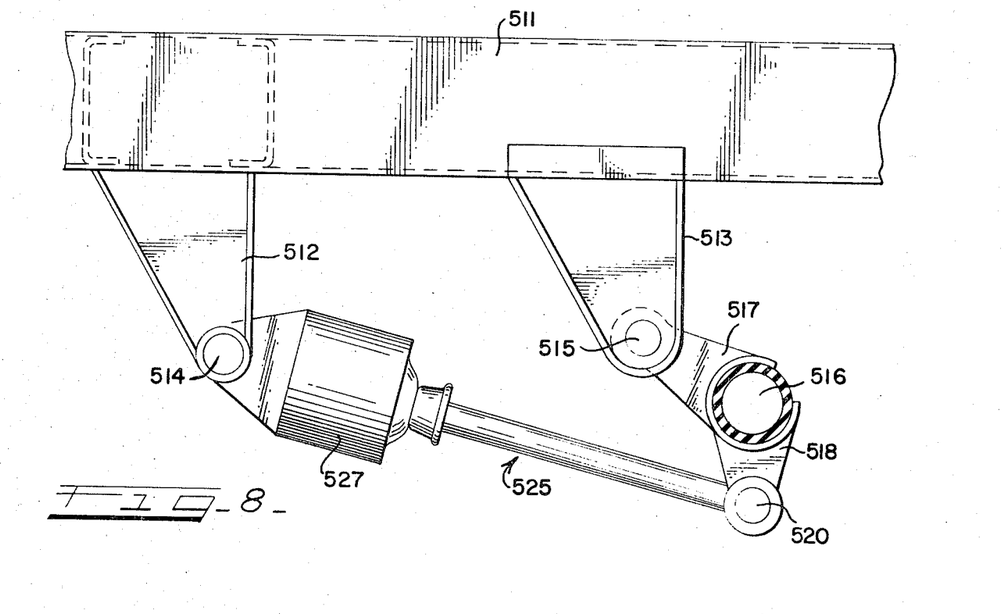
FIG. 8 is a side elevation of a single-axle suspension which illustrates the suspension principle involved in the invention.

In FIG. 8 a single-axle suspension is illustrated in which the frame side members 511 have depending pivot brackets 512 and 513 which provide pivot bearings 514 and 515. A single-axle housing 516 is disposed transversely of the frame side members 511 and spaced to the rear of the pivot bearings 515 and somewhat below the same. A radial arm 517 fixed on the housing 516 is connected at the end thereof to the bracket by a pivot in the bearing. The radial arm 517 is inclined forwardly of a vertical plane extending through the axis of the housing 516 and upwardly of a horizontal plane through the same. A radial arm 518 extends downwardly of the axle housing 516 and is pivotally connected at 520 to one end of a force bar assembly 525 which is inclined upwardly and has its opposite end connected at the pivot bearing 514. The radial arms 517 and 518 are of equal length and the force bar assembly 525 is the same construction as force bar assembly 130 in the suspension system shown in FIG. 4, employing a main rod or bar 526 and a shear spring or the like as indicated at 527. The radial arms 517 and 518 may be varied in length and/or angularity to vary the reaction at 520 and the ride. As in the other forms of the apparatus a single force absorbing rod assembly can be mounted on the longitudinal center of the frame or two may be used with one at each side of the support frame.

Preferably, the pivot connections incorporate suitable rubber bushings such as shown in Small U.S. Pat. No. 2,914,349.

While particular materials and specific structural details are referred to in describing the illustrated forms of the invention, it will be understood that other suitable materials and equivalent structural details may be resorted to within the spirit of the invention.

I claim:

1. A suspension system for wheel-supported vehicles which comprises a pair of axle housings disposed in transversely extending, parallel, longitudinally spaced relation beneath the vehicle frame structure, means forming pivot bearings at each side of said frame structure, a rigid walking beam disposed at each side of said frame structure and connected by said pivot bearings at points intermediate the ends thereof to the vehicle frame, radial arms extending from said axle housings and having their free ends pivoted to the free ends of said walking beams, the pivot connections at the ends of each walking beam being above and below the axle housings at the opposite ends, respectively, and a force absorbing bar member extending between said axle housings, radial arms extending from the axle housings and connected at the ends thereof with the ends of said bar member, each of said radial arms which connect said bar member to an axle housing extending in a direction opposite that of the radial arm which connects the walking beam thereto and one of said connections being resilient so that said bar member has a limited resilient movement in the direction along its axis whereby longitudinal components of the stresses transmitted to the axles through the walking beams as a result of static loads, braking and the like are transmitted to said bar member as substantially equal and opposite forces which cancel each other.

2. A wheel suspension system for a vehicle having a supporting frame with longitudinally extending side frame members, pivot brackets extending beneath the side frame members, a walking beam pivotally mounted intermediate its ends on each said pivot bracket, axle housings extending transversely of said supporting frame in parallel relation beneath said supporting frame and spaced longitudinally of said supporting frame, means connecting the walking beams to said axle housings with opposite ends of said walking beams being connected by pivots to arm members fixed on said housings at points which are above and below the axes of the associated axle housings and which are spaced equal distances radially from said axes so as to distribute the load on said housings with the stress resulting from the loads transmitted to the forward and rearward axle housings having horizontal components which are substantially equal, and means including a force bar assembly extending longitudinally of said supporting frame between said axle housings and inclined in a vertical direction relative to a plane extending through the transverse axes of said axle housings, opposite ends of said force bar each being connected to the axle housing at the opposite end of said force bar and said connections being at points above and below said transverse plane whereby to connect said axle housings and provide horizontal stress components which are substantially equal and opposite the horizontal stress components resulting from the loads on the system.

3. A wheel suspension system as recited in claim 2 and said axle housings being spaced equal distances forwardly and rearwardly of the pivotal mountings of said walking beams with the means connecting the walking beams to the axle housings including arm forming brackets extending radially of the axes of said axle housings and forwardly relative to vertical planes extending through said axes whereby the forces transmitted to said axle housings through said walking beams tend to rotate the axle housings in a direction toward the forward portion of the vehicle.

4. A wheel suspension system as recited in claim 3 and torque bars connecting the axle housings so as to counterbalance any rotational forces applied to the axle housings.

5. A wheel suspension system as recited in claim 2 wherein said force bar assembly includes a resilient shock absorbing member.

6. A wheel suspension system which comprises a pivot bracket extending beneath a side member of a vehicle support frame, a rigid walking beam having a pivotal connection with said bracket at a point intermediate its ends, axle housings extending transversely of said support frame and spaced fore and aft of said pivotal connection, radial arms extending above and below said axle housings and having their free ends connected to the ends of said walking beam at equal radial distances, and a stress absorbing rod member having opposite ends connected to said axle housings above and below the connection of the axle housing with the walking beam at the corresponding end thereof, the connection at one end of said stress absorbing rod assembly being resilient and permitting limited movement of said rod assembly in an axial direction whereby longitudinal components of stress transmitted to the axle housings as a result of static loads, braking and the like are canceled or absorbed through said stress absorbing connecting rod member.

7. A suspension system for wheel-supported vehicles having a supporting frame with side frame members, which comprises a pair of transverse axle housings, spaced longitudinally equidistant from a pivot bracket fixed on each side frame member, a rigid walking beam pivoted on each said pivot bracket at a point intermediate its ends, radial arms extending from the top of one axle housing and radial arms extending from the bottom of the other axle housing which radial arms are inclined relative to vertical planes through the axes of said housings in a direction forwardly of the vehicle, pivots on said arms connecting the ends thereof to the ends of said walking beams at points spaced equidistant radially from said axes, the pivots on opposite ends of said walking beams being above one axle housing and below the other axle housing, and a force bar member pivotally connected at one end to the free end of a radial arm which extends from the one axle housing in a direction generally opposite that of the radial arm which connects the walking beam thereto with the pivot point spaced equidistant from the axis of the housing, said force bar having its other end connected to the other one of sad said axle housings by a radial arm which extends in the direction generally opposite that of the radial arm which connects the walking beam the thereto, said force bar member extending diagonally and having a resilient connection with one of the axle housings so as to prevent rotation relative to each other due to horizontal components of load induced forces transmitted to the axle housings through the walking beam.

8. A suspension system as recited in claim 7 and said walking beam having its forward end connected to a radial arm extending above the forward axle housing and its rearward end connected to a radial arm extending below the rearward axle housing, and said force bar member having its one end pivotally connected to said radial arm and its other end having a shock absorbing resilient connection with a radial arm fixed on the axle housing.

9. A suspension system as recited in claim 7 and said force bar member having a shock absorbing member at one end thereof, permitting limited movement in the direction of its long axis.

10. A suspension system as recited in claim 7 and a torque rod connecting said axle housings so as to counterbalance forces tending to induce relative rotation of said axle housings and to stabilize the system when a wheel is thrown clear of the road and the brakes are applied simultaneously.

11. A suspension system as recited in claim 7 and said walking beam having its forward end connected to a radial arm extending below the forward axle housing and its rearward end connected to a radial arm extending above the rearward axle housing, and said force bar member having its forward end pivotally connected to a radial arm extending above said forward axle housing and its rearward end pivotally connected to a radial arm extending below said rearward axle housing, and a shock absorbing member at one end of said force bar member.

12. A suspension system as recited in claim 11 and a torque rod pivotally connected at opposite ends to radial arms extending from said axle housings so as to resist any tendency of the axle housings to rotate relative to each other due to rotative forces induced by loads transmitted through the walking beams to the axle housings.

13. A suspension system for wheel supported vehicles which comprises a pair of axle housings disposed in transversely extending, parallel, longitudinally spaced relation beneath the vehicle frame structure, rigid walking beam means forming pivot bearings spaced longitudinally at each side of said frame structure, radial arms extending from said axle housings and having means connecting their free ends to said pivot bearings, said radial arms extending forwardly of the axle housings, respectively, so that forces transmitted through said pivot bearings and said radial arms have a horizontal component and tend to urge said housings about their axes, and a force absorbing bar member extending between said axle housings, radial arms extending from the axle housings and having a connection with said bar member, said radial arms which connect said bar member to the axle housings extending in a direction above one and below the other one of the axle housings, respectively, and said connections being spaced radially a distance equal to the radial spacing of said pivot bearings whereby longitudinal components of the stresses transmitted to the axles through the pivot bearings as a result of static loads, braking and the like are transmitted to said bar member as substantially equal and opposite forces which cancel each other.

14. A suspension system as recited in claim 13, and the radial arms connecting the axle housings with the pivot bearings extending above and below the axle housings, respectively.

15. In a wheel suspension system which comprises means forming a pivot bearing on a side member of a vehicle support frame, an axle housing extending transversely of said support frame and disposed in a vertical plane which is offset in the longitudinal direction relative to said pivot bearing means, radial arms extending above and below said axle housing, means pivotally connecting one of said radial arms to said pivot bearing means so that the load is transmitted, at least in part, to said axle housing through said pivot bearing means and the connecting radial arm with a resultant tendency to rotate said housing about its axis, an elongate connecting rod member having a resilient stress absorbing means permitting limited extension of said rod member in the direction of its axis, means pivotally connecting one end of said rod member to a radial arm on said axle housing which extends in a direction generally opposite to the direction of the radial arm connecting said axle housing to said pivot bearing means, said connecting rod member extending in inclined relation to the plane of said vehicle support frame, and means connecting the opposite end of said connecting rod member to the vehicle support frame with one end of said connecting rod member being above the axis of said axle housing and the other end thereof being below the same whereby longitudinal components of stress transmitted to the axle housing as a result of static loads, braking and the like are absorbed through said stress absorbing connectiong rod member.

UNITED STATES PATENT OFFICE
CERTIFICATE OF CORRECTION

Patent No. 3,547,461            Dated December 15, 1970

Inventor(s) Donald E. Sheridan

It is certified that error appears in the above-identified patent and that said Letters Patent are hereby corrected as shown below:

Column 3, line 65, delete "housing"
    Column 4, line 67, cancel "f" and insert -- of --
    Column 6, line 70, after "bracket" and before "by" insert -- 513 --
    Column 6, line 71, after "bearing" insert -- 515 --
    Column 8, line 53, delete "sad"

SIGNED AND
SEALED
MAR 16 1971

(SEAL)
Attest:

Edward M. Fletcher, Jr.
Attesting Officer

WILLIAM E. SCHUYLER, JR.
Commissioner of Patents